US009031806B2

(12) United States Patent
Nunley et al.

(10) Patent No.: US 9,031,806 B2
(45) Date of Patent: May 12, 2015

(54) SYSTEMS, METHODS AND APPARATUSES FOR TESTING, CALIBRATING AND CERTIFYING OVERSPEED DEVICES

(75) Inventors: Jack A. Nunley, Rancho Cucamunga, CA (US); Geoffrey L. Nelson, San Diego, CA (US)

(73) Assignee: Access Equipment, LLC, Las Vegas, NV (US)

( * ) Notice: Subject to any disclaimer, the term of this patent is extended or adjusted under 35 U.S.C. 154(b) by 677 days.

(21) Appl. No.: 13/313,729

(22) Filed: Dec. 7, 2011

(65) Prior Publication Data

US 2012/0143555 A1 Jun. 7, 2012

Related U.S. Application Data

(60) Provisional application No. 61/420,764, filed on Dec. 7, 2010.

(51) Int. Cl.
*G01L 5/00* (2006.01)
*B66B 5/04* (2006.01)

(52) U.S. Cl.
CPC .. *B66B 5/048* (2013.01); *B66B 5/04* (2013.01)

(58) Field of Classification Search
CPC ........ G01P 3/446; G01P 3/44; G01M 13/021; B32B 15/011
See application file for complete search history.

(56) References Cited

U.S. PATENT DOCUMENTS

| | | | | |
|---|---|---|---|---|
| 3,984,083 | A | | 10/1976 | McElroy |
| 4,531,617 | A | * | 7/1985 | Martin et al. ................. 187/373 |
| 4,856,623 | A | | 8/1989 | Romig, Jr. |
| 5,662,439 | A | * | 9/1997 | Reese et al. ..................... 409/61 |

OTHER PUBLICATIONS

ALIMAK APF Technical Description & Instruction Manual, p. A10 (2001).
"Safety Code for Elevators and Escalators," The American Society of Mechanical Engineers, ASME A17.1-2000, p. 81 (issued on Mar. 23, 2001).
"Safety device tripping speed"; Ulf Wiklund; Alimak Hek, located at: J:\avdeln\berakn\safety_dev\Word\Set of safety device tripping speed.doc (Oct. 14, 2009).

* cited by examiner

*Primary Examiner* — Elias Desta
(74) *Attorney, Agent, or Firm* — Arnold & Porter LLP

(57) ABSTRACT

The present disclosure describes apparatuses, methods and systems for determining the speed at which an elevator or hoist overspeed device is activated, and for calibrating and certifying overspeed devices. A testing apparatus may comprise a test pinion which engages with the brake pinion of an overspeed; a test shaft coupled to the test pinion; a motor for rotating the test shaft; a controller for operating the motor; and a mounting bracket for holding the overspeed device in place. A recording apparatus may comprise a detector configured to detect when the rotation of the test pinion has caused the centrifugal weight of the overspeed to be displaced, and to determine the speed of the motor at that time; a memory for storing information relating to the motor; and a processor configured to perform calculations relating to the operation and speed of the motor.

23 Claims, 6 Drawing Sheets

SYSTEMS, METHODS AND APPARATUSES FOR TESTING, CALIBRATING AND CERTIFYING OVERSPEED DEVICES

CROSS-REFERENCE TO RELATED APPLICATIONS

This application claims priority under 35 U.S.C. §119(e) from U.S. Application Ser. No. 61/420,764, filed Dec. 7, 2010, the entire contents of which application is hereby incorporated by reference.

FIELD OF THE DISCLOSURE

The present invention relates to elevator and hoist braking mechanisms, particularly systems, methods and apparatuses for testing, calibrating and certifying overspeed devices.

BACKGROUND

Elevators and hoists are equipped with safety devices, or governors, to prevent the hoist car that carries passengers or materials from falling in the event of mechanical or electrical failure. One such safety device is an overspeed, which is designed to progressively brake and eventually stop the car of a rack and pinion hoist and lock it in position if the car exceeds a predetermined speed (in either an upward or downward direction).

FIG. 1 is a cutaway view of an exemplary centrifugally-activated overspeed 101 already known in the art. The overspeed 101 has a brake pinion 102 which, when mounted in a hoist car, engages a rack affixed to the mast of an assembled hoist apparatus (not shown). This brake pinion 102 is constantly engaged with the rack and turns as the hoist car travels up and down the mast. The brake pinion 102 is attached to a brake shaft 103, which under normal operating conditions terminates at the apex of a brake cone 104 (sometimes referred to as the "inner drum") and is encased in a bushing 105 to freely rotate. Attached to the brake shaft 103 and fitting inside the brake cone 104 adjacent to a backing plate 117 is a centrifugal mechanism 106 which is comprised of a main body or carrier 107, a bracing element 108, a centrifugal weight 109 (sometimes called a "dog") that is free on one end 111 and is hinged 112 on the other end 113 which abuts the bracing element 108, and a tension spring 110 which holds the free end of centrifugal weight 109 close to the carrier when the overspeed 101 is not activated.

When the hoist car exceeds a predetermined speed, the overspeed 101 is activated to brake the hoist car. The overspeed 101 is activated when the revolutions per minute of the brake pinion 102 cause the brake shaft 103 and centrifugal mechanism 106 to rotate with enough centrifugal force that the tension spring 110 is unable to counteract the centrifugal force on the centrifugal weight 109 and its free end 111 displaces outward around its hinged end 113.

With reference to FIG. 2, the centrifugal weight 109 (shown in its non-displaced position on FIG. 2) is able, when displaced, to act as a pawl and catch the edge of a lip 114 which resides on the interior surface of brake cone 104. When the centrifugal weight 109 engages the lip 114, the brake cone 104 begins to spin and winds onto a threaded shaft 115 (see FIG. 1) and is pulled upward toward a brake drum 116 until the brake cone 104 frictionally engages a brake lining 118 on the brake drum 116 and the brake cone 104 seats against the brake drum 116. At this point, the brake shaft 103, and thus the brake pinion 102, can no longer rotate, and the overspeed 101 mounted inside the hoist car brings the car to a stop on the rack.

Overspeed devices 101 are routinely tested in the field upon hoist installation at a job site, but are also required to be periodically inspected, calibrated, and re-certified for continued safe use. Currently such inspection and certification procedures are undocumented and somewhat imprecise in that they depend upon human reaction to adjust and detect the trip speed of the centrifugal weight 109, for example. Further, no records of an individual overspeed's performance in calibration or certification tests are maintained or provided to the owner of the overspeed; all that is provided is a data tag with a certification expiration date for the current overspeed calibration.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Disclosed herein are systems, methods and apparatuses for determining the speed at which an overspeed device is activated. A system according to the present disclosure comprises a testing apparatus and a recording apparatus. The testing apparatus may comprise a test pinion configured to engage with the brake pinion; a test shaft coupled to the test pinion such that the test pinion rotates when the test shaft is rotated; a motor coupled to the test shaft, such that the motor can rotate the test shaft; a motor controller coupled to the motor, wherein the motor controller controls the operation and speed of the motor; and a mounting bracket configured to hold the overspeed device such that the test pinion may engage the brake pinion. A recording apparatus according to the present disclosure may comprise a detector configured to detect when the centrifugal weight has been displaced and to determine the speed of the motor at the time the centrifugal weight was displaced. The recording apparatus may further comprise a memory for storing information relating to the speed and operation of the motor and the detector, and a processor for performing related calculations.

A method for detecting the speed at which an overspeed device is activated comprises coupling the brake pinion of the overspeed device to the test pinion of a testing apparatus; activating the motor, whereby the motor causes the test pinion to rotate, thereby driving the brake pinion; increasing the speed of the motor until the free end of the centrifugal weight is displaced; and storing in a memory the speed of the motor at the time when the centrifugal weight was displaced.

BRIEF DESCRIPTION OF THE DRAWINGS

Non-limiting and non-exhaustive embodiments of the present invention are described with reference to the following figures.

DETAILED DESCRIPTION

Figure 1:
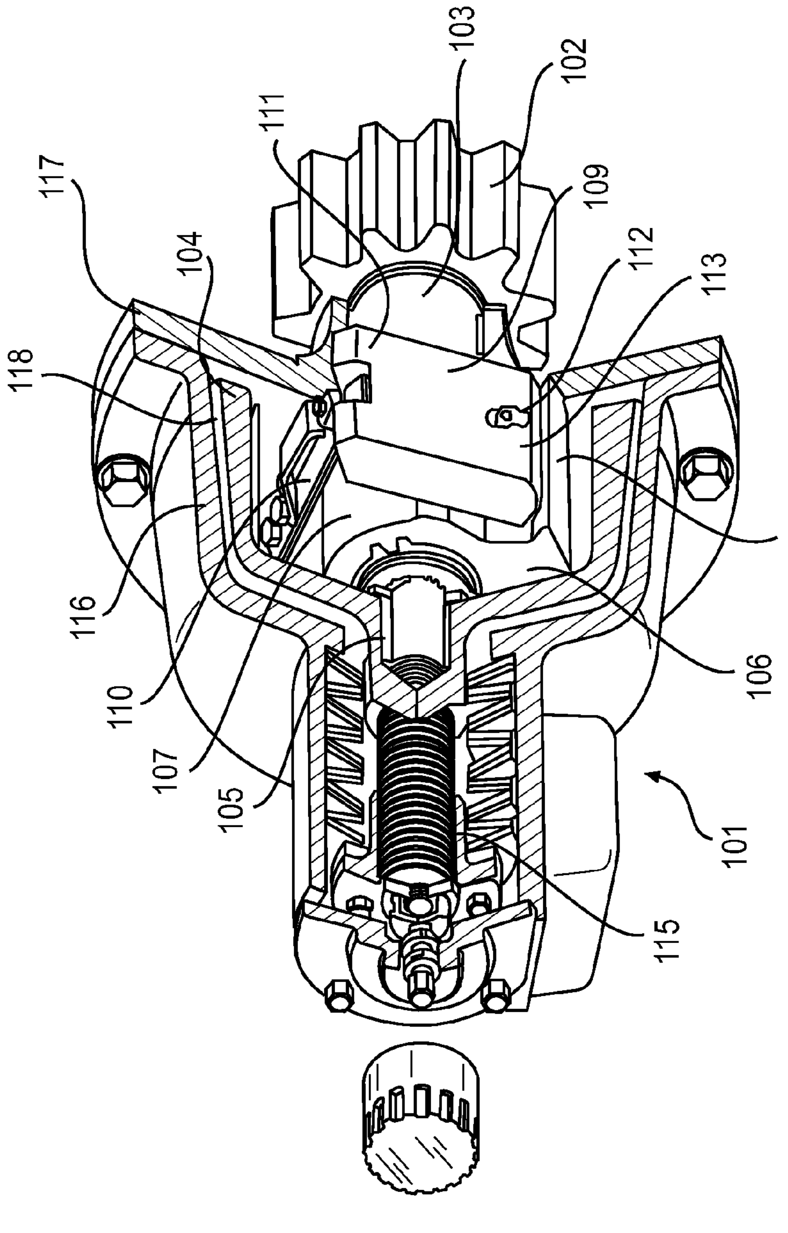
FIG. 1 is a cutaway view of an exemplary overspeed to be tested by an apparatus of the invention.
Figure 2:
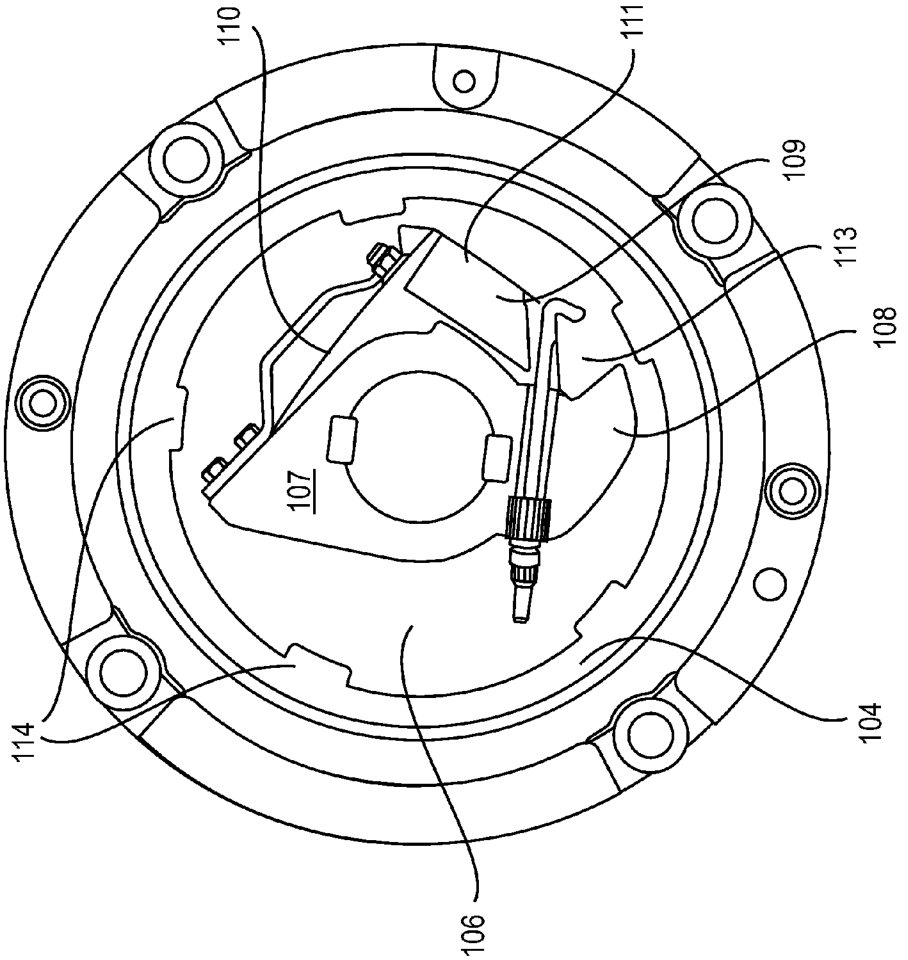
FIG. 2 is a trans-sectional view facing a backing plate and showing a centrifugal mechanism and brake cone.
Figure 3:
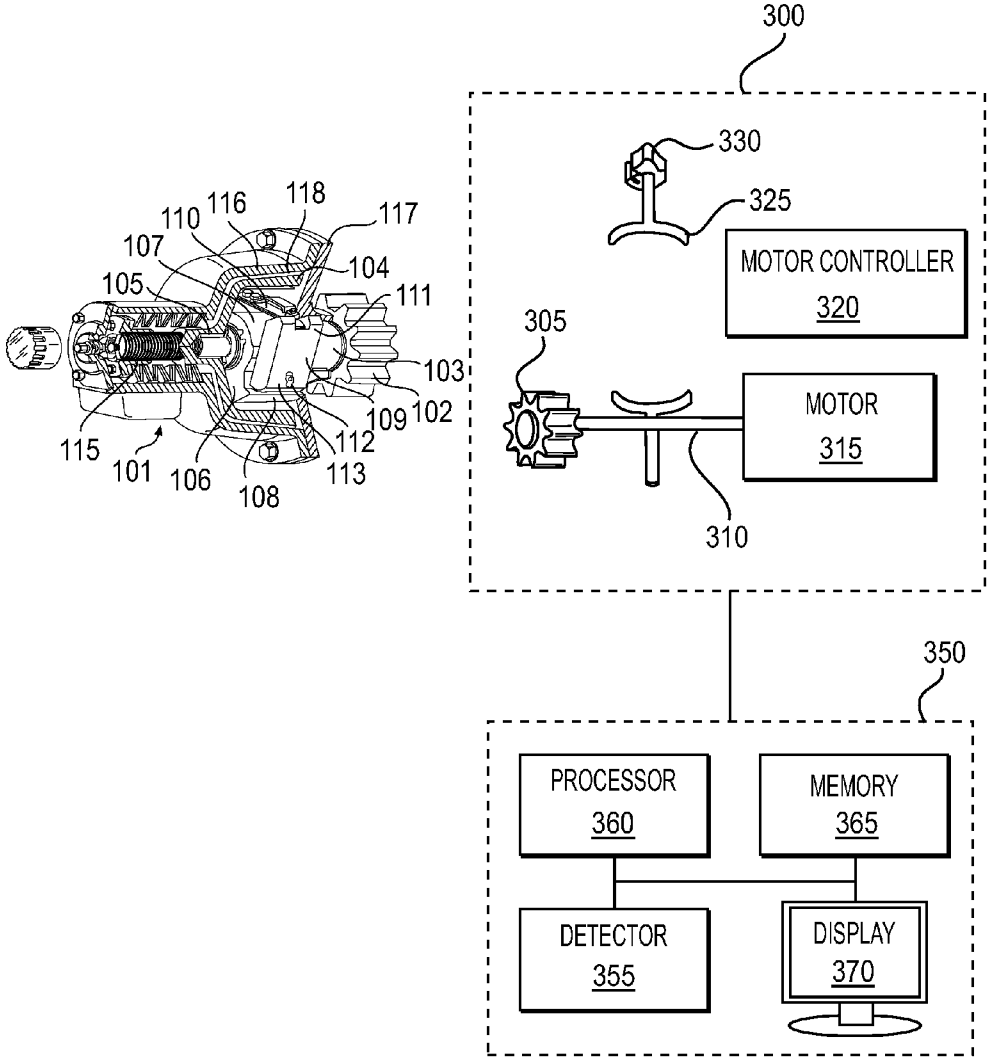
FIG. 3 is a logical diagram of an exemplary system according to the present disclosure, showing an overspeed coupled to a testing apparatus and a recording apparatus.

The present disclosure describes apparatuses, methods and systems for testing, calibrating and inspecting overspeed devices. FIG. 3 shows an exemplary system according to the current disclosure. As shown, the system first comprises an overspeed device 101 of the sort depicted in FIGS. 1 and 2 and discussed in more detail above.

The system may further comprise a testing apparatus 300. As shown in FIG. 3, a testing apparatus may comprise a test pinion 305 capable of engaging the overspeed brake pinion 102, such that brake pinion 102 is adjacent to and meshes with the teeth of test pinion 305. The test pinion 305 can be changed to accommodate the pinion size of the overspeed 101 to be tested, so that the test pinion 305 and the overspeed brake pinion 102 fully engage with each other.

The test pinion 305 may be affixed to a test shaft 310, such that if the test shaft 310 is rotated, the test pinion 305 will rotate, and in turn, the overspeed brake pinion 102 will rotate.

The testing apparatus 300 may further comprise a motor 315 which is coupled to the test shaft 310. The motor 315 can be used to automate the rotation of the test shaft 310 and test pinion 305, in turn allowing for the automated rotation of the overspeed brake pinion 102. In one embodiment, the motor 315 may be a generator, actuator or transducer. In another embodiment, the motor 315 may be an electric motor, such as an AC, DC, or universal motor. The motor 315 may also be of variable speed, such as, for example, a frequency drive motor or a multi-speed motor.

A motor controller 320 may be coupled to the motor 315 so as to activate and control the motor 315. For example, the motor controller 320 may adjust the speed and/or turn on or off the motor 315. The motor controller 320 may be any form of hardware, software, or combination thereof, suitable for controlling and/or adjusting the speed of the motor 315 such as, for example, switches with or without a relay, a sensor, or both, variable frequency drives, vector drives, direct torque control drives, Servo controllers, step function generators, rheostat devices or other potentiometers, Programmable Logic Controllers (PLCs), Field Programmable Gate Arrays (FPGAs), Application-Specific Integrated Circuit (ASICs), personal computers, or any device capable of running code.

Depending on the embodiment, the motor controller 320 may be operated manually, remotely or automatically, and may be programmable or manually adjustable. In programmable embodiments, the user may program or set predetermined parameters that may include overspeed 101 type, maximum motor 315 speed, desired speed at which the centrifugal weight 109 displaces (in rpm, feet/min, etc.), rated speed of the overspeed 101, as well as a range of acceptable deviation on either side of that selected speed, typical use pattern, rate of motor speed increase or decrease, ramp or step functions to control motor speed increase/decrease, maximum torque, etc. A range of acceptable deviation from a predetermined speed may be for example 1%, 3%, 5%, 10%, 15% or 20% greater than or less than the predetermined speed. In another embodiment, deviation from a predetermined speed may be measured in ranges such as, for example 110-145% of the rated speed of the overspeed 101, 115-142% of the rated speed, 115-140% of the rated speed, 115-135% of the rated speed, or 115-130% of the rated speed.

The testing apparatus 300 may further comprise an overspeed mounting bracket 325, to which the backing plate 117 of an overspeed 101 can be mounted. The mounting bracket 325 can be used to hold the overspeed 101 in place, such that the test pinion 305 may properly align and engage with the teeth of the brake pinion 102.

Depending on the embodiment, it may be desirable to remove the brake drum 116 and brake cone 104 of the overspeed 101 from the backing plate 117 prior to mounting the backing plate 117 to the mounting bracket 325. In such an embodiment, the centrifugal mechanism 106 may remain on the backing plate 117, connected via the brake shaft 103. The brake pinion 102 may also remain connected via brake shaft 103, on the opposite side of backing plate 117.

In some embodiments, the mounting bracket 325 may have a mechanism 330 for adjusting the position of the overspeed 101 when it is mounted on the bracket 325 (to accommodate various models of overspeed). For example, in one embodiment, the mechanism 330 may be a vertical and/or horizontal slide with manual or motorized threaded or push-adjusting rods which can finely adjust the position of the overspeed 101 on the mounting bracket 325. In another embodiment, the mechanism 330 may comprise a movable arm, which may be secured once the overspeed 101 is in the desired position. Other means will be apparent to one skilled in the art. In this manner, the mounting bracket 325 can be moved so as to properly align the teeth of the brake pinion 102 and the test pinion 305.

Once the overspeed 101 has been coupled to the testing apparatus 300, the motor 315 may be activated by the motor controller 320, causing the test pinion 305 to rotate. This causes the test pinion 305 to drive the brake pinion 102, which in turn rotates the brake shaft 103 and the centrifugal mechanism 106. As the motor 315 speed increases, centrifugal force acts on the free end 111 of the centrifugal weight 109. This centrifugal force can be countered, to some extent, by the force of tension spring 10. At some speed, however, the centrifugal force acting on the free end 111 will exceed the force of tension spring 110 and, in such a case, the free end 111 of the centrifugal weight 109 will displace outward from the main body 107 of the centrifugal mechanism 106. At this point, the overspeed 101 is considered “activated”. The speed at which activation is desired may vary across different models or types of overspeeds, and may be set to a particular desired speed or within a particular speed range. Such speeds or ranges can be selected from manufacturers’ recommendations, local, state or federal laws or rules, standards from authoritative bodies (e.g., ANSI/ASME A17.1; 2.18.2), or based on other desired performance characteristics of a particular overspeed or hoist configuration.

FIG. 3 also shows a recording apparatus 350 designed to record certain characteristics of the overspeed 101 and/or the testing apparatus 300 during testing and particularly when the overspeed 101 has been activated. The recording apparatus 350 may comprise a detector 355 located on or near the overspeed 101 to detect the displacement of the centrifugal weight 109 and to determine the speed of the motor 315, the centrifugal mechanism 106, or both, at the time the weight 109 is displaced. The detector 355 may be configured so as not to require any human intervention or action to detect displacement of the weight 109 or to determine the speed of the motor 315 or the centrifugal mechanism 106. Suitable detectors 355 may include but are not limited to transistors, various types of switches (including proximity, electromechanical, magnetic, hydraulic, etc.), photosensors, motion sensors, accelerometers, digital logic circuits, and high-level software logic such as an interrupts. In some embodiments, activation of the detector 355 may also stop the motor 315, e.g., by engaging the testing apparatus’s motor controller 320.

A processor 360 may also be coupled to the detector 355 for the purpose of performing certain useful calculations. For example, it may be desirable to calculate quantities relating to the operation and speed of the motor 315, e.g., the real-time speed of the motor 315, the speed of the motor 315 when the overspeed 101 is tripped, the equivalent distance per time conversion, parameters of the overspeed 101 being tested, etc. This processor 360 may be any form of hardware, software or combination thereof suitable for implementing the methods described herein. It will be understood that in certain embodiments this processor 360 may be the same as the motor controller 320 which governs the operation of the motor 315.

The processor 360 and/or the detector 355 may be coupled to a memory 365 capable of storing information regarding the motor 315 and the overspeed 101. For example, the memory 365 may store the speed of the motor 315 and/or the centrifugal mechanism 106 determined by the detector 355 at the time the weight 109 was displaced. Additional information pertaining to the testing, calibration, certification, and working order of the overspeed 101 can be stored, such as checklists for testing, specifications for particular overspeed models, condition of parts, parts replaced, cleaned or refurbished, data pertaining to trip speed and adjustments made, dates of certification and expiry, serial and part numbers, notes, etc.

A suitable memory 365 may be any form of volatile or non-volatile memory such as, for example, RAM memory, flash memory, ROM memory, EPROM memory, EEPROM memory, registers, hard disk, a removable disk, a CD-ROM, or any other form of storage medium known in the art. The processor 360 and/or the detector 355 may be coupled to the memory 365 via a wired connection (e.g., on-board via, Ethernet, cable, serial, USB, SCSI, etc.) or wireless connection (Wi-Fi, Bluetooth, etc.). In one embodiment, the processor 360, the detector 355 and the memory 365 may all be physically located on the same physical chip.

The processor 360 and the memory 365 may further be configured to include algorithms and/or databases to identify characteristics and specifications of different overspeeds, convert real-time and stored motor speeds into different units of measurement (units of distance per time), and store generated and existing data for individual overspeeds (testing, calibration, certification, and working order data), etc.

The detector 355 and/or the memory 365 may also be coupled to a display 370 configured to visually present information relating to the operation and speed of the motor 315. The display 370 may present menus and/or desired data such as motor speed, centrifugal weight trip speed in rpm, feet/minute, etc., acceptable deviation range, previous test results and maintenance history, serial, model, or other identification number of the overspeed being tested, manufacturer, or any other data. The display 370 may acquire this information from the controller(s), the detector 355 or the memory 365, or it may be entered by the user through a separate user interface (not shown).

In certain embodiments, the recording apparatus 350 may also include a printer (not shown).

Figure 4:
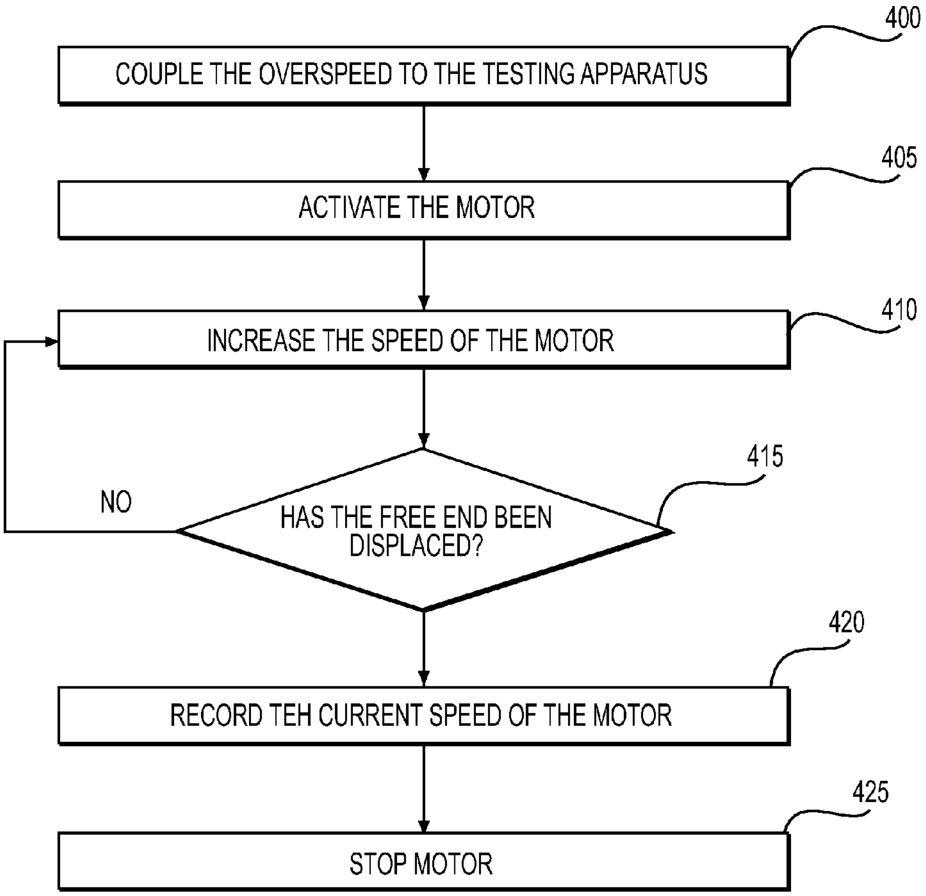
FIGS. 4-6 are flow charts illustrating various exemplary methods according to the present disclosure.
Figure 5:
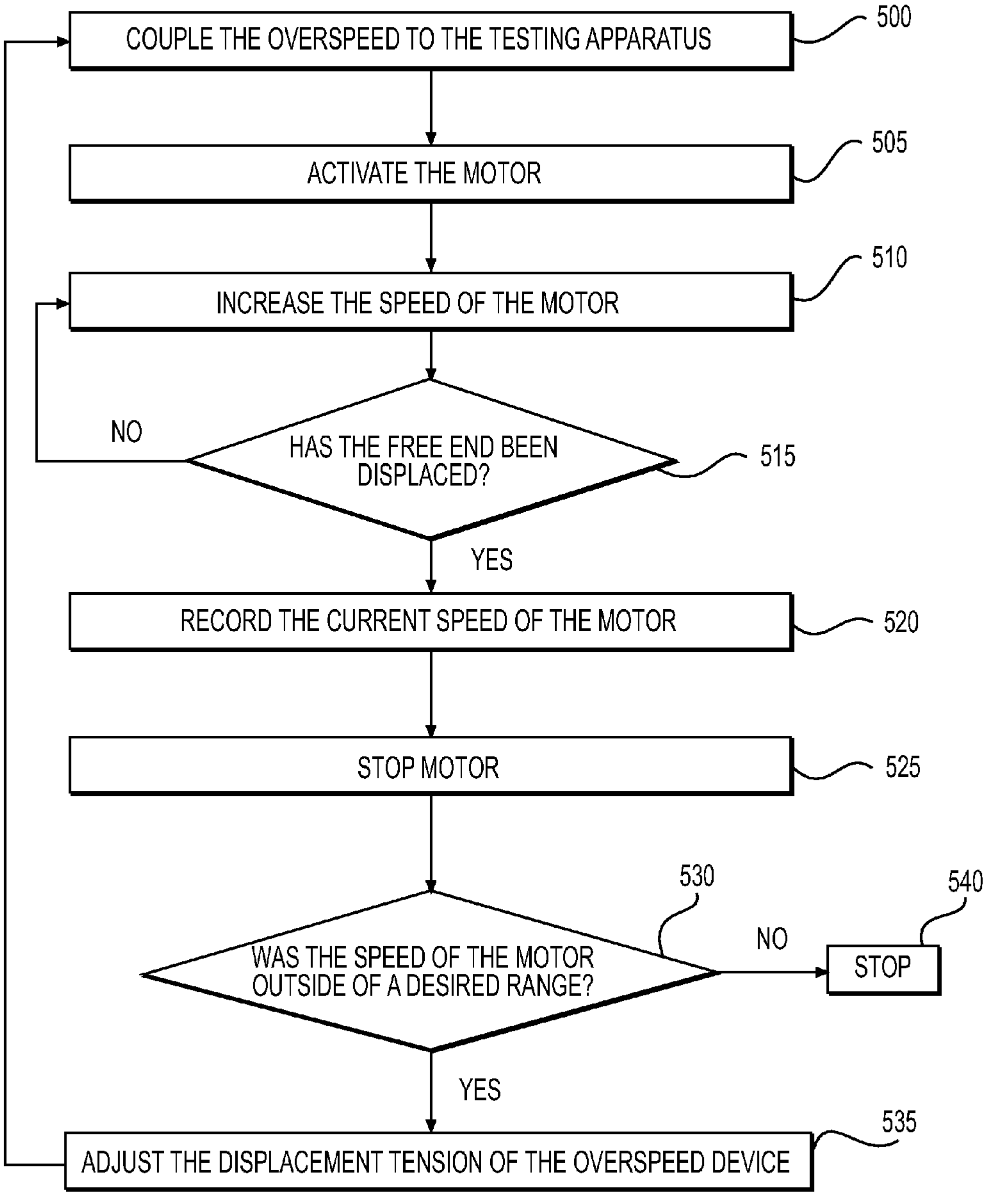
Figure 6:
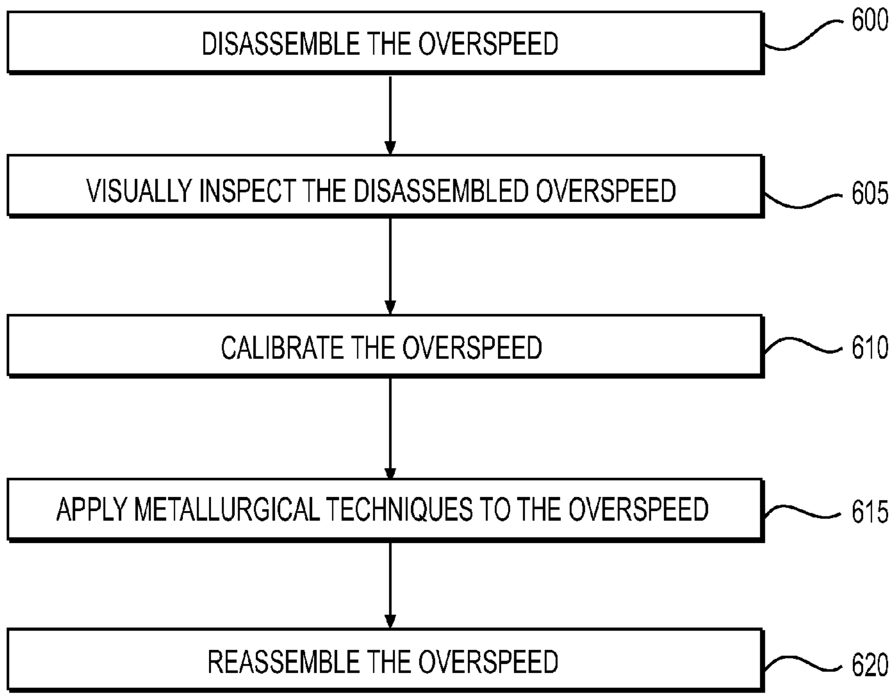

FIGS. 4-6 show how a system according to the present disclosure may be used to test, calibrate and certify an overspeed device 101.

FIG. 4 shows one method by which an overspeed device 101 may be tested. At step 400, an overspeed device 101 may be coupled to a testing apparatus 300. At step 405, the motor controller 320 may activate the motor 315. At step 410, the motor controller 320 may increase the speed of the motor 315, causing the test pinion 305 to drive the brake pinion 102. For example, in one embodiment, the motor controller 320 may increase the speed of the motor 315 by an incremental step, which may be a predetermined or dynamically-generated amount of increase in speed.

At step 415, the detector 355 of the recording apparatus 370 may determine whether the free end 111 of the centrifugal weight 109 has displaced outward from the main body 107 of the centrifugal mechanism 106. If the weight 109 has not yet been displaced, the method may return to step 410 and increase the speed of the motor 315. If at step 415, however, the detector 355 determines that the weight 109 has been displaced, then at step 420 the processor 360 may record the current speed of the motor 315 into the memory 365, and at step 525, the motor controller 320 may stop the motor 315.

FIG. 5 shows an exemplary method by which an overspeed may be calibrated. At step 500, an overspeed device 101 may be coupled to a testing apparatus 300, and at step 505, the motor controller 320 may activate the motor 315. At step 510, the motor controller 320 may increase the speed of the motor 315, and at step 515, the detector 355 may determine whether the free end 111 of the centrifugal weight 109 has displaced outward from the main body 107 of the centrifugal mechanism 106. If the weight 109 has not yet been displaced, the method may return to step 510 and the motor controller 320 may increase the speed of the motor 315. If not, then at step 520 the processor 360 may record the current speed of the motor 315 into the memory 365, and at step 525, the motor controller 320 may stop the motor 315.

Then, at step 530, the method may determine whether the speed at which the centrifugal weight 109 was displaced is outside of a desired speed or range. If it is, i.e., the overspeed 101 will not stop the hoist at a desired speed, then, at step 535, adjustments may be made to the displacement tension of the centrifugal weight 109. This tension, and the precise mechanism for making adjustments, will vary by the model or manufacturer of the overspeed 101. It may be adjusted such that displacement conforms to the tension, or speed desired. Then, the method may return to step 505 and repeat steps 505-535 until the overspeed 101 conforms to the desired standard. At this point, the method may stop, as shown at step 540.

FIG. 6 shows one exemplary method of certifying an overspeed 101 to ensure continued safe operation and good performance. Certification may comprise calibration of the centrifugal mechanism 106 as described above, inspection of components of the centrifugal mechanism 106 and the rest of the overspeed 101, and replacement of worn or damaged components. It may further comprise written verification of compliance with e.g., manufacturer's specifications, local, state, and/or national regulations or standards and would provide for a tag or certificate stating that the overspeed meets certain safety parameters and is valid for a certain period of time before recertification is required.

As shown in FIG. 6, at step 600, the overspeed 101 may be partially disassembled, by, for example, the removal of selected bolts, screws or both, such that one or more of the brake cone 104, centrifugal weight 109, base 117 and brake surface 118 can be inspected. At step 605 the partially disassembled device 101 and any of its components may be visually inspected for wear, missing parts, or both, and to note the presence of any debris, shavings and/or marks. This inspection is designed to assess the safety of an overspeed 101; all components of the overspeed that bear stress (e.g., torque, compression) or that move may be subject to impact, fatigue, uneven wear, or other wear like glazing, pitting, thinning, gouges, or cracks, etc. For example, the brake lining 118 may be evaluated for thinning, wear or glazing; all surfaces may be checked for metal wear, cracks or irregularities; and the pinion 102, the bushing 105, the overspeed housing (not shown) and any compression washers (also not shown) may be checked.

Then, at step 610, the overspeed 101 may be calibrated in accordance with the methods described with respect to FIG. 5.

In some embodiments, at step 615, it may be desirable to more closely evaluate metal surfaces for stress and wear by employing other analytical techniques. Such means are well-known in the art of metallurgy, and include, for example, magnetic-particle, eddy-current, and radiographic inspection methods, optical and scanning electronic microscopy, and ultrasonic and acoustic emission techniques.

By way of illustration of one such means, commercial products are available to facilitate non-destructive evaluation of metal fatigue, surface discontinuities and fine cracks using, e.g., magnetic flux analysis of surface and near-surface regions of parts such as the overspeed housing, shaft, etc. Such systems detect flux leakage fields cause by discontinuities in the metallic part. Generally, the part to be inspected is subject to a magnetic field and fine ferrous particles are applied, either dry or wet. If an area of the metallic part being evaluated is cracked or discontinuous, the particles will tend to aggregate at the flux leakage field formed in the discontinuous area. The aggregated particles are then detected, for example through a pigment or dye combined with the particles and observable with application of light in the visible or UV spectrum. Exemplary systems are MAGNAGLO or MAGNAVIS systems (Magnaflux Corporation, Glenview, Ill.). Alternatively, visual penetrants can be used such as the SPOTCHECK or ZYGLO systems, also from Magnaflux Corporation. One having ordinary skill in the art will understand, however, that there are many other methods by which it is possible to evaluate metal surfaces for wear and tear. In other embodiments, it may be desirable not to visually inspect parts at all, but simply to use these metallurgical techniques.

At step 620, the disassembled overspeed 101 may then be reassembled.

Ongoing safe operation of overspeeds 101 involves periodic re-certification; failure to have a current certification can cause delays on job sites. Thus, it may be desirable to store within the memory 365 a database of overspeed 101 certifications, including but not limited to performance and certification data for individual overspeeds, and maintenance records. In such a manner, overspeed inventory and work requirements can be managed within regulatory requirements and good business practices.

In the event of an accident involving an overspeed 101 (or failure thereof), it may be desirable to have evidence of the overspeed's certification and repair history. In such a case, printouts of the overspeed's certification and maintenance records may be acquired from the memory 365 and provided to the overspeed operator. Data from the testing and maintenance may also be stored within the memory 365 for an extended period of time. Retention of such data allows for tracking, service/certification reminders, and enhanced business records.

Depending on the specific embodiment, the testing apparatus may be portable, such that it can be transported to job sites, businesses or wherever else an overspeed is located, so as to provide convenient testing, calibration and certification according to the disclosed methods on-site. A truck or other suitable vehicle may be adapted to carry the testing apparatus and any other supplies and/or components which may be used to service, test, calibrate and/or certify overspeeds as described herein.

While specific embodiments and applications of the present invention have been illustrated and described, it is to be understood that the invention is not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the present invention disclosed herein without departing from the spirit and scope of the invention. For example, the various optional elements discussed herein, such as signal preparers, data stream restorers, encoders, amplifiers, filters and protective circuits, may be mixed and combined as desired for each particular application.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What is claimed is:

1. A system for determining the speed at which an overspeed device is activated, the overspeed device having at least a brake pinion and a centrifugal weight, the system comprising:

- a testing apparatus comprising: a test pinion configured to engage with the brake pinion; a test shaft coupled to the test pinion such that the test pinion rotates when the test shaft is rotated; a motor coupled to the test shaft to rotate the test shaft; a motor controller coupled to the motor, wherein said motor controller controls the operation and speed of the motor; and a mounting bracket configured to hold the overspeed device for the test pinion to engage the brake pinion; and
- a recording apparatus comprising: a detector configured to detect when the centrifugal weight has been displaced and to determine the speed of the motor at the time the centrifugal weight is displaced.

2. The system of claim 1, the recording apparatus further comprising a memory for storing information relating to the displacement of the weight and operation and speed of the motor.

3. The system of claim 2, the recording apparatus further comprising a processor configured to receive information from the detector, to perform calculations with respect to information relating to the operation and speed of the motor, and to read and write said received information and calculations to the memory.

4. The system of claim 3 wherein the motor controller and the processor are combined into a single unit.

5. The system of claim 1 wherein the testing apparatus further comprises a display connected to the motor controller to present information to a user.

6. The system of claim 1 wherein at least one of the motor controller and the detector are automated.

7. The system of claim 1 wherein the testing apparatus and the recording apparatus are housed in a single unit.

8. The system of claim 7 wherein the single unit is portable.

9. A testing apparatus for automating the testing of an overspeed device, the overspeed device having at least a brake pinion and a centrifugal weight, the testing apparatus comprising:

a test pinion configured to engage with the brake pinion;

a test shaft coupled to the test pinion such that the test pinion rotates when the test shaft is rotated;

a motor coupled to the test shaft to rotate the test shaft;

a motor controller coupled to the motor, wherein said motor controller automatically controls the operation and speed of the motor; and a mounting bracket configured to hold the overspeed device for the test pinion to engage the brake pinion.

10. The testing apparatus of claim 9 further comprising at least one of a detector configured to detect when the centrifugal weight of said overspeed is displaced, and a memory for storing information relating to the detector and the operation and speed of the motor.

11. The testing apparatus of claim 9, wherein the controller automatically controls the operation and speed of the motor according to predetermined parameters.

12. A recording apparatus for recording the speed at which an overspeed device is activated by a testing apparatus, the overspeed device having at least a brake pinion and a centrifugal weight, and the testing apparatus having at least a motor configured to cause the brake pinion to rotate, the recording apparatus comprising:

a detector configured to detect when the centrifugal weight is displaced and to determine the speed of the motor at the time the centrifugal weight is displaced; and a memory for storing information relating to the operation and speed of the motor.

13. The recording apparatus of claim 12 further comprising a controller configured to perform calculations with respect to information relating to the detector and the operation and speed of the motor, and to read and write said calculations and information to the memory.

14. The recording apparatus of claim 12, wherein the detector operates without any human action.

15. A method for detecting the speed at which an overspeed device is activated, the overspeed device having at least a brake pinion and a centrifugal weight, said method comprising the steps of:

coupling the brake pinion of the overspeed device to the test pinion of a testing apparatus, said testing apparatus comprising a test pinion coupled to a motor via a test shaft;

activating the motor, whereby the motor causes the test pinion to rotate, thereby driving the brake pinion;

increasing the speed of the motor until the free end of the centrifugal weight is displaced; and storing in a memory the speed of the motor at the time when the centrifugal weight is displaced.

16. The method of claim 15, wherein the step of increasing the speed of the motor is performed by an automatically operated motor controller.

17. The method of claim 15, wherein a detector determines that the free end of the centrifugal weight is displaced.

18. The method of claim 17, wherein the detector operates without any human action.

19. The method of claim 15, wherein the motor causes the test pinion to rotate according to one or more predetermined parameters.

20. The method of claim 15, further comprising the step of visually presenting to a user information relating to the operation and speed of the motor on a display apparatus.

21. The method of claim 15, further comprising the step of causing the motor to turn off when the free end of the centrifugal weight is displaced.

22. The method of claim 15 further comprising calibrating the overspeed device to operate within a predetermined speed range, said method comprising repeating the steps of:

detecting the speed at which the overspeed device is activated;

determining whether the speed of the motor is outside the predetermined speed range; and adjusting the displacement tension of the overspeed device;

until the speed of the motor at the time the overspeed device is activated is within the predetermined speed range.

23. The method of claim 22, wherein the step of determining whether the speed of the motor is outside the predetermined speed range is determined by a processor.

* * * * *